(12) United States Patent
Bearden

(10) Patent No.: US 8,464,801 B2
(45) Date of Patent: Jun. 18, 2013

(54) APPARATUS FOR COLLECTING ARTIFICIAL TURF FOR RECYCLING

(76) Inventor: John H. Bearden, Woodstock, GA (US)

( * ) Notice: Subject to any disclaimer, the term of this patent is extended or adjusted under 35 U.S.C. 154(b) by 402 days.

(21) Appl. No.: 12/820,132

(22) Filed: Jun. 21, 2010

(65) Prior Publication Data

US 2010/0319510 A1    Dec. 23, 2010

Related U.S. Application Data

(60) Provisional application No. 61/218,947, filed on Jun. 20, 2009.

(51) Int. Cl.
*A01B 45/04* (2006.01)

(52) U.S. Cl.
USPC ............................................... 172/20

(58) Field of Classification Search
USPC .............. 172/15–21, 133; 111/100–102, 107, 111/200; 47/1.01 F, 56, 59, 1.01 R, 58; 242/564.5; 198/463.1, 717; 241/101.7, 101.741, 241/101.742, 186.35

See application file for complete search history.

(56) References Cited

U.S. PATENT DOCUMENTS

| | | | | |
|---|---|---|---|---|
| 4,686,008 | A | * | 8/1987 | Gibson ........................ 202/118 |
| 4,925,113 | A | * | 5/1990 | Wissman et al. .......... 241/101.4 |
| 5,230,473 | A | | 7/1993 | Hagguist |
| 5,497,949 | A | | 3/1996 | Sharer |
| 5,562,779 | A | | 10/1996 | Allaway |
| 5,676,320 | A | * | 10/1997 | Merklinger ............ 241/101.741 |
| 5,860,244 | A | * | 1/1999 | Casimaty et al. ........... 47/1.01 F |
| 5,897,066 | A | | 4/1999 | Bacon |
| 5,902,414 | A | | 5/1999 | Keal |
| 6,123,036 | A | * | 9/2000 | Decker ........................ 111/200 |
| 6,769,495 | B1 | * | 8/2004 | Van Loen ....................... 172/19 |
| 6,793,164 | B2 | | 9/2004 | Stroppiana |

* cited by examiner

*Primary Examiner* — Robert Pezzuto
(74) *Attorney, Agent, or Firm* — Invention Protection Associates, LLC

(57) ABSTRACT

A turf collecting machine capable of automatically collecting laid artificial athletic turf, separating the infill and tufted backing components of the collected turf, and then depositing those separated components into separate storage containers. The apparatus also includes mechanisms for cleaning the infill particles collected.

9 Claims, 2 Drawing Sheets

APPARATUS FOR COLLECTING ARTIFICIAL TURF FOR RECYCLING

BACKGROUND

The present invention generally relates to turf removal equipment, and it is specifically directed to a self-powered machine capable of lifting and removing artificial athletic turf from the base surface upon which it lies, granulating and segregating the turf's infill particles component from its tufted and coated substrate sheet component, particlizing the tufted and coated substrate component, and depositing collected infill material particles and substrate material particles into separate storage units so that the respective material mixtures may be transported off-site to undergo any further processing needed to prepare them for reuse as infill material in a future turf installation.

Artificial athletic turf is generally comprised of at least one sheet layer of fabric backing substrate through which filament yarn is inserted, via a tufting process, to form a grass-resembling pile that is further bonded to the backing by application of coating material onto the bottom face of the backing and yarn backloops. For installation as a playing surface, the turf is laid atop a resilient base mat that helps to help cushion athletes' joints and give the turf surface a more natural feel. Thereafter, a granular mix of small particles (typically, rubber and sand particles), called "infill," is poured atop the tufted backing to occupy space between the synthetic grass blades much like natural soil would. So, in addition to improving playing surface resiliency, this infill material imposes a protective barrier between the athletes' cleats and the backing fabric.

Artificial turf has long been used as a playing surface for sports that are traditionally played on grass fields, such as football, baseball, and soccer. In fact, in parts of the United States that experience exceedingly precipitous weather, an artificial playing surface may be viewed as almost essential to playing those sports outdoors during certain times of year. For example, in the Great Lakes geographic region, artificial turf may be preferred over natural grass as an American football outdoor playing surface because of the likelihood that a natural surface will harden and become more difficult to maintain during prolonged cold weather typically experienced throughout the traditional autumn football season. At the same time, in the Pacific Northwest region, a water permeable synthetic surface may be preferable because of the water puddle formation and overall deterioration that a natural surface would experience due to region's excessive rainfall. Conversely, because the arid conditions of the desert Southwest region require that a natural grass field be extensively irrigated, synthetic turf is often preferred as an outdoor sports playing surface there as well. Furthermore, an artificial turf surface permits sports traditionally performed on natural grass to be played in climate-controlled indoor facilities, as artificial turf does not require the sunlight exposure needed to sustain natural grass. Nevertheless, a heavily used sports turf field, in any climate, will eventually experience enough wear and to necessitate replacement of its tufted and coated substrate component, if not its infill component before that.

Historically, the proposition of de-installing an artificial turf field has involved winding up, into large rolls, sections of tufted backing sheet, loading those rolls onto a hauling vehicle, and transporting them to a disposal site (e.g., a landfill). However, by conventional methods, the proposition of removing an entire sports field of artificial turf can be a quite laborious and time consuming, and it requires use of several men and/or units of machinery of different functions. Moreover, operators of many landfill sites will not even permit dumping of these large because of the highly inefficient use of space that doing so represents.

Consider that a typical American football field, for example, may comprise an artificial turf surface spanning 57,600 ft.sup.2 and weighing, with infill, approximately 1,060,000 total lbs. (18.4 lbs./ft.sup.2). Consider, further, that such a turf field is typically formed by an aggregation of 160 ft. by 15 ft. sections (24 sections in total) that adjacently lie atop the base surface. It generally takes a crew of at least three men to crimp a 15 ft. wide end of a section and initiate the winding up of any portion of its 160 ft. length. Then, after a roll is begun to be formed, a bulldozer or other power machine must be employed to continue pushing and winding up the section until, because of increasing weight of the enlarging roll, the section must be severed and the roll completed. Typically, a 160 ft. long section of turf is cut at approximately 30-foot intervals so that it is wound into 5 separate rolls, weighing almost 8,300 lbs. each, that can be fork lifted onto a flatbed truck and hauled off-site for further processing or disposal. Thus, up to 120 repetitions of this winding and lifting process need be performed, with all of the time and manpower implied thereby.

It should also be noted that, conventional artificial turf removal methods can be quite wasteful in that they may involve the discarding of sand and rubber infill material that could have been reused in a future turf installation. Furthermore, testing has shown that the mix of polymers that often comprise the tufted and coated substrate, such as polyethylene, polypropolene and urethane, can by recycled by extrusion and, when augmented with additives like natural rubber, may exhibit sufficient durometer to, itself, be later used as infill material in an athletic turf installation. Thus, when an infill-laden turf is simply buried or otherwise abandoned, potentially hundreds of thousands of dollars worth of infill material for use on future sports turf is, in effect, lost with it.

Therefore, at some juncture within the artificial turf removal process, it is desirable to salvage infill material by extracting it from the turf's substrate sheet. One rudimentary way to accomplish this is by using a human or vehicle-draw raking implement to loosen any compacted infill particles and then using suction or blow means to collect those particles. Of course, however, while this may salvage infill that retains commercial value, it likely involves a considerable amount of man work, powered machine operation, and, presumably, cost even before any effort or cost is expended winding up or otherwise displacing the turf. Consequently, apparatuses that can more sophisticatedly extract infill from turf substrates have been devised in the prior art. For examples, U.S. Pat. Nos. 5,562,779 to Allaway, et al. and 5,902,414 to Keal, et al. disclose embodiments of vehicle-drawn apparatuses capable of jet spraying compressed air at an incline angle against artificial turf in order to dislodge infill particles from the substrate and direct them into a collection chamber. The collected infill material can then be cleaned and re-deposited onto the substrate, or it can be retained for use with an altogether different turf. However, despite the obvious benefit of salvaging infill material, employing these, and similar, machines of the prior art may simply lengthen the de-installation process by virtue of adding an infill extraction step to be performed on the tufted substrate sheet prior to the step of removing it from the base surface. Furthermore, known machines do not obviate the aforementioned need to utilize the efforts of several workers and/or multiple units of equipment just to carry out the work of removing the substrate. In fact, that the present inventor is aware of, there is no single prior art apparatus capable of performing both an infill extraction function and a substrate sheet removal function near simultaneously.

Therefore, one can appreciate an outstanding need for an individual, self-contained apparatus capable of: (1) displacing continuous strips of artificial athletic turf from a base surface, (2) dislodging the displaced turf's infill material component from its tufted and coated backing component, (3) separately collecting each set of the segregated materials, and (4) appropriately preparing them for disposal or, more likely, storage and potential deployment in a future synthetic turf installation. The turf collecting apparatus of the present invention substantially fulfills this need.

SUMMARY

It is an object of the present invention to provide a self-contained apparatus capable of cutting and continuously collecting, from a laid artificial turf field, a reasonably wide and indefinitely long strip of turf as an operator drives the apparatus over the field.

It is another object of the invention to decompact and then extract, from the collected strip, particulate infill material and then to capture that extracted infill so that it might be appropriately processed (e.g., filtered, cleaned, etc.) and deposited into storage receptacles for future reuse.

It is another object of the invention to shred the collected infill-free, tufted substrate sheet into smaller particles so as to enable that material to be bagged for either: (a) more efficient disposal or (b) further processing and transformation into turf infill material.

In one aspect of the invention, the apparatus includes an engine drive mechanism sufficiently powerful to advance the apparatus along a laid artificial turf as the apparatus engages, lifts, and collects strips of the turf, weighing as much as 18 lbs./ft.sup.2, and eventually deposits the collected material into on-board storage hopper units.

In another aspect of the invention, the apparatus features a turf collection mechanism that may comprise a cutting head used in cooperation with a conveyor arrangement. In the present disclosure, the term "cutting head" generally defines a forward-projecting arrangement of vertically oriented cutting blades separated by a horizontally oriented leading edge that, when driven horizontally against an artificial turf layer, carves out and separates, from the underlying base surface, an edge-wide turf strip. A first conveyor has an upwardly inclined segment adjacent the cutting head so that it may advance the carved strip further into the apparatus as the apparatus continues progressing along the turf.

In another aspect of the invention, the apparatus features an extraction mechanism that may comprise a cooperating bristle and cam beater arrangement that, itself, functions in cooperation with a horizontally disposed segment of the aforementioned conveyor. The bristle and beater arrangement is configured to fragment any compacted infill particles residing along the collected turf strip and to further dislodge the infill material from the collected turf strip as the strip conveys past it pile side facing down.

In another aspect of the invention, the apparatus features a shredding mechanism for particlizing the tufted substrate after the infill material has been displaced therefrom, rather than leaving the tufted and coated substrate in a bulkier, more difficult to dispose of, and almost virtually useless sheet form.

In another aspect of the invention, the apparatus features a pair of storage units for separately retaining the extracted infill particles and the shredded turf particles.

Finally, in other aspects of the invention, embodiments of the apparatus may also include mechanisms for cleaning (e.g., washing and drying) and for filtering debris from (e.g., sifting out larger objects and/or magnetically extracting metal objects) the extracted infill material, as well as other mechanisms that facilitate apparatus operator comfort and ease of machine control.

DESCRIPTION OF A PREFERRED EMBODIMENT

As will become apparent from the discussion below in connection with the accompanying drawings, the present disclosure has particular applicability to engine-driven machines used to automatically collect laid artificial athletic turf materials, separate constituent components of the collected turf, and then deposit those separated components into separate storage containers. However, those having skill in the art should appreciate that the present disclosure has general applicability to situations where it is desirable to uninstall artificial athletic turf, irrespective of whether it is further desirable to separate any of its constituent materials.

Figure 1:
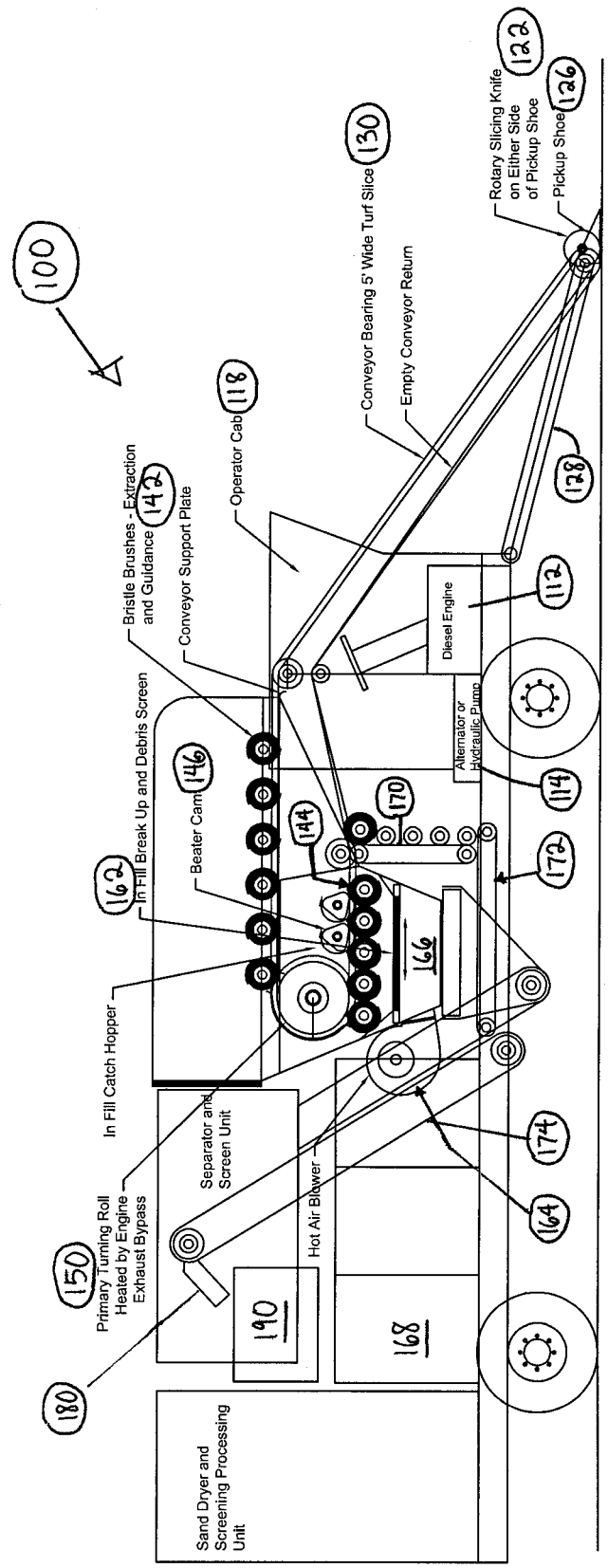
FIG. 1 is a side elevational, diagrammatic view of an artificial turf collecting apparatus in accordance with the present disclosure.

Referring now to FIG. 1, there is diagrammed a collection apparatus 100 principally comprising: (a) an internal drive mechanism 110 for propelling the entire apparatus 100 while it is engaged to and cutting through a laid turf (not shown); (b) a cutting head 120 for slicing out and lifting a strip of turf (not shown) from the laid surface as the apparatus 100 advances in the direction of laid turf; (c) a non-porous conveyor 130 for carrying the collected strip away from the cutting head 120 and progressing it further through the processing compartment of the apparatus 100; and (d) an extraction mechanism 140 of revolving brushes 142, 144 and cam beaters 146 that the conveyor 130 runs the strip through in both upright and inverted condition.

In a preferred embodiment, the internal drive mechanism 110 may comprise a commercially available truck chassis equipped with a 200-horsepower diesel engine 112 for propelling the entire apparatus 100, as well as a 150-kilowatt alternator 114 for powering all on-board functions, including drive mechanisms for its conveyors 130, 170, 172, 174, turf shredder 190, etc. However, it will be appreciated by those skilled in the art that the collection apparatus 100 can be equipped with an integrated, onboard hydraulic system or other type of drive mechanism capable of propelling it. Preferably included, also, is a complete computer control system (not shown), located in the operator cabin portion 118 of the apparatus drive mechanism 110, that features multiple sensor monitoring and closed circuit imaging of all critical apparatus functions.

Figure 2:
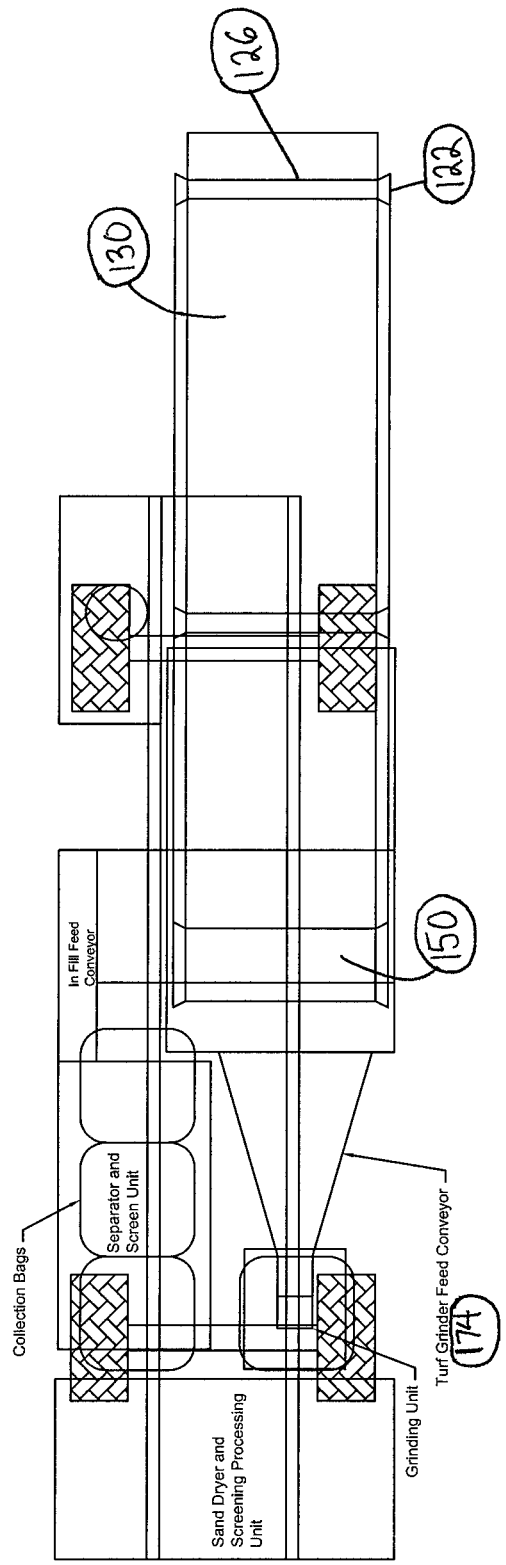
FIG. 2 is a top plan, diagrammatic view of the turf collecting apparatus of FIG. 1.

The cutting head 120 can take a variety of configurations. Nevertheless, as can be gleaned from the preferred embodiment diagrammed in FIGS. 1 & 2, the cutting head 120 comprises a left-right pair of self-sharpening rotary blades 122 with a leading edge, or "pickup shoe" 126, disposed between them. The lateral separation between rotary blades 122 (and, thus, the length of the pickup shoe 126) may be 5 feet, for example. The cutting head 120 precedes the rest of the apparatus 100, as it is forwardly extended from the apparatus chassis by a pair of laterally spaced support arms 128. Therefore, as the drive mechanism 110 forwardly propels the apparatus 100 along the turf, the pickup shoe 126 wedges between the turf layer and the base layer (i.e., directly underneath the turf backing), while the rotary blades 122 carve out a 5-foot wide strip of turf from the rest of the field. By virtue of the apparatus's continuing forward motion, the turf strip is forced onto the conveyor 130. It is anticipated that the apparatus 100 will be driven at a rate of at least 10 feet per minute, but it should be noted that apparatus speed shall closely correspond with in-feed conveyor speed so that the scooped turf strip is smoothly draw into the machine 100 with a minimal disturbance of the infill material disposed over the strip.

In the preferred embodiment shown in FIG. 1, the conveyor 130 has a forward portion 132 that is inclined and leads away from the cutting head 120 and a rearward portion 134 that is horizontally disposed with upper and lower levels 136, 138 that collected turf is to travel against. More specifically, the forward conveyor portion 132 carries the carved out strip of turf, along with infill material residing atop it, up away from the ground and onto the upper level 136 of the rearward conveyor portion 134. While conveying along this upper level 136, a series of soft-bristled rotary brushes 142 which define part of the machine's extraction mechanism 140 are disposed just above the conveyor belt and brush against the turf strip to begin loosening the infill material. After passing through these upper brushes 142, the conveyor belt wraps around its primary turning roller 150. The presence of a semi-cylindrical guide surface 152 that closely, partially encircles the turning roller 150 keeps the collected strip pressed against the lower level 138 of the conveyor's rearward portion 134 as the strip is inverted and then conveyed in the counter direction.

Just below the lower level 138 of the conveyor 130 resides another series of rotary brushes 144, and impinging on the upper face of the lower level 138 are beater cams 146 which, in combination, also form part of the extraction mechanism 140. As the upside down facing turf strip is threaded through these brushes 144 and cams 146, points along the lower level segment 138 of the conveyor belt are reciprocated upward and downward, jarring loose any infill that may remain adhered to the substrate. The combination of brush 144 rotation action and gravity thereby causes all of the infill particles to simply fall from the brush-supported turf strip.

The fallen infill initially lands upon a vibrating filter screen 162 that has a plurality of openings (not shown) which are only slightly larger than the average grain size of the infill particles. Thus, the filter screen breaks up any clumps of fallen infill particles and traps debris that is larger than a typical individual infill particle. In a preferred embodiment of the machine 100, a magnetic filter screen 162 is used to entrain any metallic debris that may be small enough to have otherwise permeated the screen 162. Of course, magnetic versions of other components of the extraction mechanism 140 could be employed for the same effect. In any event, filtered infill particles pass though the screen 162 and continue their fall into a collection hopper 166. Once there, the infill is exposed to hot air being expelled by an adjacent blower 164. This dries out the infill and readies it for off-board storage.

While the infill is being collected, the "cleaned" turf strip is guided from the initial conveyor 130 to a series of secondary conveyors 170, 172, 174 which ultimately lead the strip to a chute 180. The converging chute 180 reduces the width of the strip by folding it, and funnels it to a 50-horsepower shredder 190 located at the rear of the apparatus 100. The shredder 190 reduces the strip of turf material to pieces less the 10 millimeters in size. These ground pieces of tufted and coated turf material will then fall from the shredder 190 into a second hopper 168. Both the collected infill and turf particles may then be emptied from their respective on-board containers 166, 168 and packaged appropriately for shipment.

The inventor anticipates that additional processes not described herein may be used to separate tufted yarn strands from the backing component of the turf in order to facilitate recycling of the old turf into infill material.

While the invention has been particularly shown and described as referenced to the embodiments thereof, those skilled in the art will understand that the foregoing and other changes in form and detail may be made therein without departing from the spirit and scope of the invention.

What is claimed is:

1. An apparatus for collecting laid artificial turf for recycling, the apparatus comprising:
   a drive mechanism capable of advancing the apparatus along the laid turf;
   a collection mechanism configured to cut a strip of the laid turf of a certain width out of a laid turf of greater width and to lift the cut turf strip from an underlying base surface as the apparatus advances;
   an extraction mechanism configured to extract particulate infill material from the turf strip;
   a first storage mechanism configured to bag the extracted infill material; and
   a second storage mechanism configured to bag the lifted turf.

2. The apparatus of claim 1, wherein said collection mechanism comprises:
   a pair of cutting blades having vertically oriented cutting edges and being horizontally spaced apart in order to cut a turf strip of a width corresponding to that spacing out of a laid turf of greater width;
   a leading edge that is horizontally oriented in order to separate laid turf from the base surface, wherein the leading edge is disposed between the cutting blades; and
   a conveyor arrangement configured to convey the turf strip from the leading edge to the extraction mechanism.

3. The apparatus of claim 2, wherein said extraction mechanism comprises a bristle and beater arrangement configured to dislodge the infill material from the turf strip.

4. An apparatus for collecting, for recycling, laid artificial turf of a type comprising a backing sheet, tufted yarn and particulate infill material, the apparatus comprising:
   a drive mechanism capable of advancing the apparatus along the laid turf;
   a cutting head configured to cut a strip of the laid turf of a certain width out of a laid turf of greater width and to lift the turf strip from an underlying base surface as the apparatus advances along the laid turf;
   a conveyor arrangement configured to convey the turf strip away from the cutting head, wherein the conveyor arrangement conveys the turf strip in an upright condition and, subsequently, inverts the turf strip and then conveys it in an inverted condition so that infill material separates from the turf strip due, at least in part, to gravity;
   a bristle arrangement configured to brush the turf strip and loosen the infill material whilst the turf strip is being conveyed in an upright condition; an infill receptacle configured to receive separated infill material for storing; and
   a turf receptacle configured to receive the substantially infill-free turf for storing.

5. The apparatus of claim 4, further comprising a turn guide mechanism configured to guide the turf as it is being inverted by said conveyor arrangement.

6. The apparatus of claim 4, further comprising a beater arrangement for further dislodging infill material whilst the turf strip is being conveyed in an inverted condition.

7. The apparatus of claim 4, further comprising a sifting mechanism configured to sift extraneous particles from infill material.

8. The apparatus of claim 4, further comprising a shredding mechanism configured to shred the turf strip into particles, wherein these particles are received into said turf receptacle.

9. The apparatus of claim 4, wherein said cutting head comprises:
    a pair of cutting blades having vertically oriented cutting edges and being horizontally spaced apart in order to cut a turf strip of a width corresponding to that spacing out of a laid turf of greater width; and
    a leading edge that is horizontally oriented in order to separate laid turf from the base surface, wherein the leading edge is disposed between the cutting blades.

\* \* \* \* \*